May 22, 1962 S. GAULEY 3,035,665

DECELERATION RESPONSIVE BRAKE

Filed Oct. 5, 1960

INVENTOR.
SHERMAN GAULEY
BY Frank C. Parker
David E. Dougherty
ATTORNEY & AGENT

United States Patent Office 3,035,665
Patented May 22, 1962

3,035,665
DECELERATION RESPONSIVE BRAKE
Sherman Gauley, Irondequoit, N.Y., assignor to Bausch & Lomb Incorporated, Rochester, N.Y., a corporation of New York
Filed Oct. 5, 1960, Ser. No. 60,630
1 Claim. (Cl. 188—136)

This invention relates to a deceleration responsive brake and, more particularly, to a deceleration responsive brake having means for responding to a predetermined rate of deceleration.

The object of the present invention is to provide a brake which is energized by the pre-determined movement of the brake members in response to a pre-determined deceleration. The brake is relatively inexpensive to manufacture, facilitates rotational balance of the assembly, and tends to minimize adjustments of the mechanical actuating parts.

Briefly, the invention contemplates a brake having a rotatable member, a stationary member and a plurality of engaging elements pivotally mounted on the rotational member. The engaging elements are disposed with their centers of gravity between the pivotal mounting means therefor and the center of rotation of the rotatable member. Rotation of the engaging elements about the pivotal mounting axis causes the engaging elements to frictionally engage the stationary member. The rotation of the elements is in response to deceleration of the rotatable member which causes the braking action.

The invention will now be described in detail in connection with the accompanying drawings in which.

Figure 1:
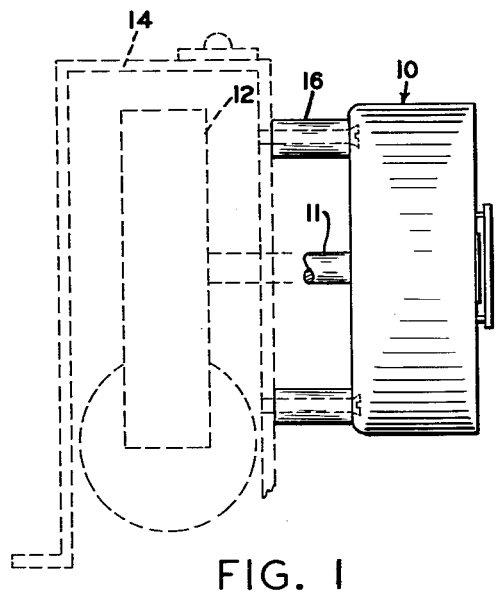
FIG. 1 shows a deceleration responsive brake mounted on a motor shaft.

Referring now more particularly to FIG. 1, the invention comprises a deceleration responsive brake 10 which is shown in conjunction with a motor 12. The brake 10 is rigidly fixed to the motor housing 14 by bolt and spacer assemblies 16, and acts on the rotatable shaft 11.

Figure 2:
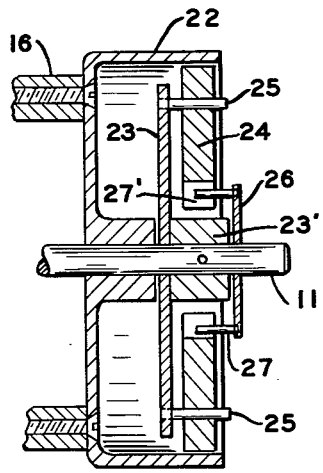
FIG. 2 is a cross sectional view of a brake made in accordance with this invention and is taken along the line 2—2 in FIG. 3.
Figure 3:
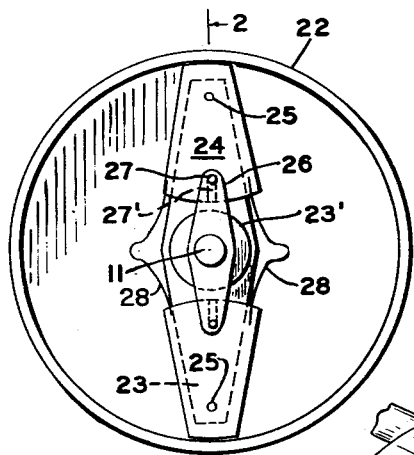
FIG. 3 is a plan view of the brake assembly according to one embodiment of the invention.
Figure 5:
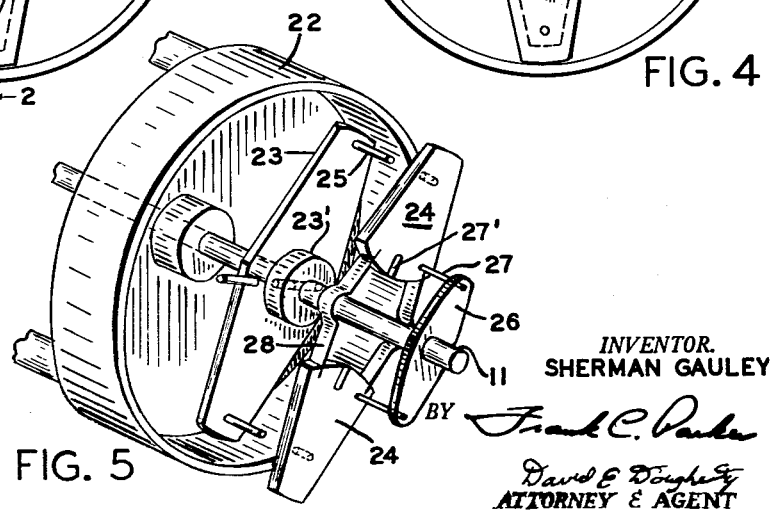
FIG. 5 is an exploded perspective view of certain features of a brake made in accordance with the first embodiment of the invention.

The first embodiment of the invention, as shown in FIGS. 2, 3 and 5 comprises the rotatable shaft 11 and a stationary drum 22. Carried on the shaft 11 is a rotatable member 23 provided with a hub 23'. The hub 23' of the rotatable member 23 is keyed to the shaft 11. The rotatable member 23 carries a pair of sprag members 24 pivotally mounted on a pair of projecting pins 25. The sprag members 24 frictionally engage the stationary drum 22 on deceleration of the shaft 11. A connecting member 26 interconnects the sprag members 24 and is pivotally mounted on the rotatable shaft 11. A pair of pins 27 on the connecting member 26 rides in slots 27' of the sprags 24 so that the sprag members are equally responsive to deceleration. A spring 28 interconnects the sprags 24 in order that a finite force is required to overcome the spring tension and actuate the brake in response to a pre-determined deceleration. Bolt and spacer assemblies 16 are shown mounted on the back of drum 22 in order to rigidly attach the brake assembly to the motor housing.

Figure 4:
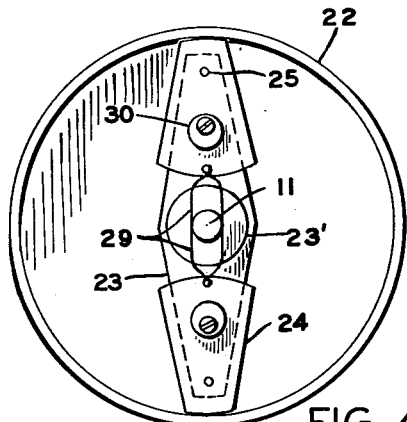
FIG. 4 is a plan view of the brake assembly according to a second embodiment of the invention.

A second embodiment of the invention is shown in FIG. 4. The rotatable shaft 11 carries the rotatable member 23. The rotatable member 23 is provided with the hub 23' which is keyed to the shaft 11. The rotatable member 23 carries the pair of sprag members 24 pivotally mounted on the projecting pins 25. The sprag members 24 are responsive to deceleration to frictionally engage the stationary drum 22. A spring member 29 interconnects the sprag members 24 in a manner such that the sprag members are equally responsive to deceleration and so that a finite force is required to actuate the brake 10. A weight member 30 may be adjustably mounted on one or more of the sprag members in order to change the center of gravity of the sprag members so that the brake will not be responsive until a predetermined deceleration is reached. The maximum actuating force will be achieved by having the center of gravity midway between the axis of rotation of the rotatable shaft 11 and the pins 25. The center of gravity may be changed by adjusting the weights 30 which will decrease the moment whereby an increased deceleration will be required to actuate the sprag members 24.

The operation of the brake mechanism will be described in conjunction with FIGS. 2, 3 and 5. In operation of the brake mechanism upon acceleration, assuming the shaft 11 to be rotating in a counter-clockwise direction, there is a tendency for the lower portion of the sprag 24 to lag behind, thereby pivoting the sprags 24 counter-clockwise about the pivots 25. This tends to create a drag between the trailing edges of the outer periphery of the sprags 24 and the inner periphery of the drum 22, which drag tends to return the sprags 24 to the position shown. Consequently, there is little or no braking effect exerted on the shaft 11 during acceleration of the shaft 11.

During deceleration of the shaft 11, assuming that it is rotating in a counter-clockwise direction, there will be a tendency for the inner portions of the sprag members 24 to exert a force due to the inertia caused by the center of gravity being between the pivot and the hub. The moment of force after overcoming the spring tension will pivot the sprags 24 on the pivots 25 in a clockwise direction. This will tend to bring the leading edges of the outer peripheries of the sprags 24 into engagement with the inner periphery of the drum 22 and will have the effect of locking the sprags relative to the drum so as to effect braking action upon the shaft 11.

It is contemplated that changes and modifications may be made in the present invention without departing from the spirit or scope thereof.

What is claimed is:

A deceleration responsive brake comprising a rotatable member, a stationary member and a plurality of engaging elements pivotally mounted on said rotatable member, said engaging elements having their center of gravity between the pivotal mounting and the axis of rotation of said rotatable member, a connecting member slidably connecting said engaging elements to each other, and a spring connecting said engaging elements, said engaging elements being adapted to rotate about their respective pivots to frictionally engage said stationary member for braking the rotatable member in response to the deceleration of said rotatable member, and said spring being adapted to normally hold said engaging elements out of contact with said stationary member.

References Cited in the file of this patent
UNITED STATES PATENTS
2,042,280    Stuart _____ May 26, 1936